July 23, 1968
L. E. THESING
3,393,558
MOTOR TIMING DEVICE
Filed Aug. 18, 1966
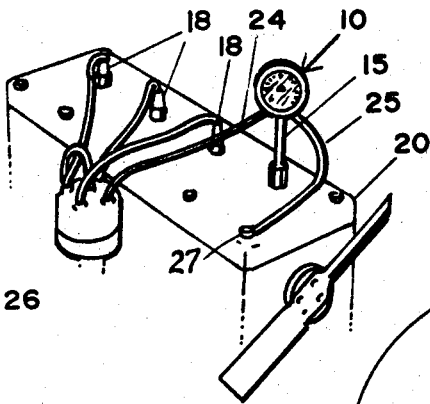
FIG. 1
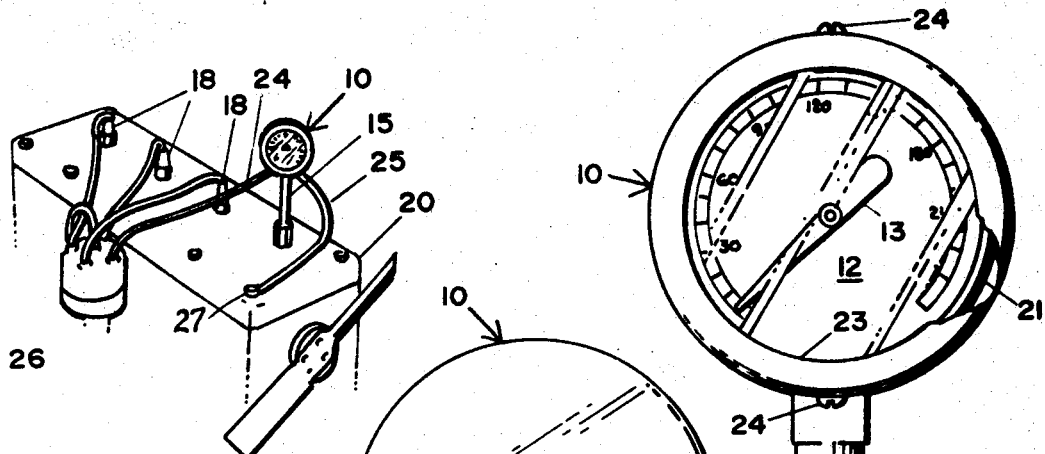
FIG. 3
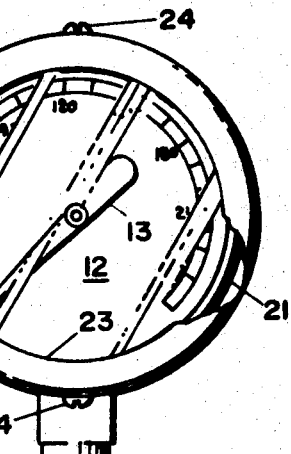
FIG. 2
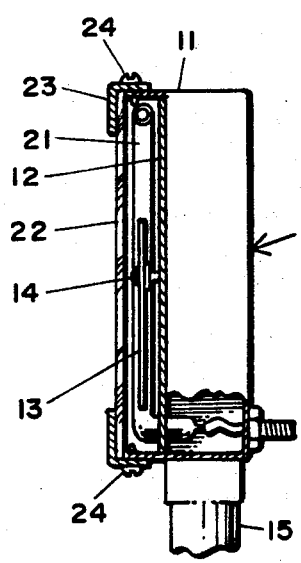
FIG. 4
INVENTOR
LAWRENCE E. THESING
BY
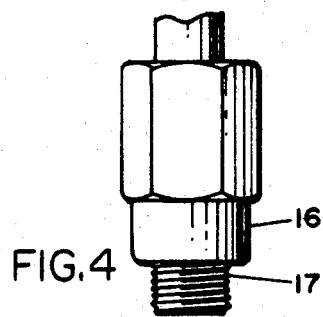

United States Patent Office 3,393,558
Patented July 23, 1968

3,393,558
MOTOR TIMING DEVICE
Lawrence E. Thesing, 550 E. 46th St.,
Hialeah, Fla. 33013
Filed Aug. 18, 1966, Ser. No. 573,332
1 Claim. (Cl. 73—118)

ABSTRACT OF THE DISCLOSURE

A motor timing device consisting of a pressure gauge having a tubular member for connecting to a motor cylinder with a constricted portion therein for controlling the flow of fluid pressure to the gauge, the gauge having a dial face and an open portion covered by a glass face with a neon lamp extending about the periphery of the dial face and an electrical conductor for connecting the neon lamp and the distributor for indicating pressure at discharge of electricity by the distributor.

---

This invention relates generally to automotive testing devices and is more particularly directed to a motor timing device.

A principal object of the present invention is to provide an automotive testing device which indicates the timing of the spark with relation to the compression within the particular cylinder of the motor and thereby permitting the ready adjustment of the spark to the optimum time of occurrence for attaining maximum efficiency of the motor.

Another object of the present invention is to provide a motor timing testing device which is simple in construction, inexpensive in cost and one that may be used with facility and accuracy by an ordinary person not having the skill of an automobile mechanic.

A further object of the present invention is to provide an automotive testing device that not only indicates the timing of the spark with relation to the compression in a cylinder, but also indicates the maximum pressure attained by the cylinder as well as the brightness of the spark so that faults in the ignition system may be discovered if such exist.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

FIGURE 1 is a perspective view of a motor showing my motor timing device in position thereon.

FIGURE 2 is a front elevational view of the motor timing device as seen removed from the motor.

FIGURE 3 is a rear elevational view.

FIGURE 4 is a side elevational view with parts broken away.

Referring to the drawing wherein like numerals are used to designate similar parts throughout the several views, the numeral 10 refers to a conventional pressure indicating gauge 10 having the usual housing 11 which contains the mechanism actuated by pressure. The housing 11 is open on one side to permit viewing a dial face 12 and the dial arm 13 which is secured to the pivot pin 14. The pressure gauge 10 is provided with a tubular member 15 that extends to the housing 11 and having its lower end threadedly connected to an adapter 16. The adapter 16 has a threaded end portion 17 equal in size to a spark plug 18 that it replaces in a motor block 20 that is being tested by the device 10. Since motors utilize different sized spark plugs, the adapter 16 may be readily unthreaded from the tubular member 15 and replaced by an adapter of the proper size.

On the rear wall of the housing 11 are two terminals or posts 21 and 22 which extend through the housing 11 and the dial face 12 and are connected to the ends of a neon lamp 21. The neon lamp 21 extends arcuately about the rim of the dial face 12. The open face of the housing 11 is encased by a tinted glass face 22 which is held in place by a rim cover 23 fastened to the housing 11 by screws 24. The cover 23 is provided with a flange portion that engages the glass face 22 and extends thereacross a distance sufficient to cover the neon lamp 21 as best shown by FIGURE 4. Within the tubular member 15 is a restriction opening 30 which controls the flow of pressure to the pressure gauge 10. Without this restriction, the dial arm 13 would not register the exact maximum pressure but would be out of control and swing beyond it.

The terminal or post 22 which is positive is connected to an insulated electrical conductor 24 while the terminal 21 has a conductor 25 connected thereto.

In the normal use of my motor timing device 10, I remove one of the spark plugs 18 from the motor 20 that is to be tested along with its conductor that extends to the distributor 26. The motor timing device 10 is threaded in place on the block where the spark plug had been removed, and the conductor 24 is connected to the distributor 26 in lieu of the removed spark plug wire. The conductor 25 is connected to a ground such as shown to a block bolt 27.

When the engine or motor 20 is running, the cyclic pressure attained by the cylinder in which the pressure gauge 10 is mounted will register on the conventional pressure gauge 10. At the same time the neon lamp will light up as the distributor makes its contact. With the use of a tinted glass face 22 and the rim cover 23 covering the neon lamp 21 from the view of the person using the testing device, the dial arm 13 will become lit up when the neon light 21 flashes on. The person can then ascertain with accuracy the exact postion of the dial arm 13 at the time of firing so that if the firing time for the motor 20 is off, it can be corrected.

In order for the firing time to be correct so that the motor 20 may operate at its maximum efficiency, the dial arm 13 will reflect the light of the neon lamp 21 before it has reached its maximum reading by from 2½% to 10% as determined by instruction charts of the particular motor vehicle. For example, if the maximum pressure developed by the motor 20 is 70 lbs., then the neon lamp 21 should light up before the dial arm 13 has reached the 70 lb. indication as at the 60 lb. mark on the dial face 12. If the neon lamp 21 lights up before or after that position of the dial arm 13, the timing can be readily corrected by a simple adjustment of the distributor 26. There is an adjustment screw (not shown) on the distributor 26 which is loosened and the distributor head can then be rotated to change the timing in whatever direction it is found necessary.

Although the metallic tubular member 15 will act as an electrical conductor to ground the negative current at the terminal 21, there may be some residual and static electricity in the metal housing 11. In order to prevent a person from touching the housing 11 and receiving a minor shock or jolt, the electrical conductor 25 will ground any electricity in the housing 11 as well as acting as a ground for the device 10 if the tubular member 15 does not effectively ground the device 10. If the housing 11 were made of plastic, then there will be no need for the terminal 21 or ground conductor 25 since the metallic tubular member 15 will act as the ground connection when connected directly to one end of the neon lamp 21.

Since my motor timing device 10 indicates maximum pressure developed by the motor 20, each of the cylinders can be tested for faulty valves or cylinder rings. Likewise, if the neon lamp 21 does not light up at its normal brightness then there is a fault in the ignition system that must be corrected.

Having disclosed my invention, what I claim as new and desire to secure by Letters Patent is:

1. A motor timing device comprising a pressure gauge, tubular means mounted on said pressure gauge for connecting said gauge to a motor cylinder, said tubular means having a restriction for controlling the flow of fluid pressure therethrough, said pressure gauge having an open portion, a glass face covering said open portion and a cover engaging said glass face and fastened to said housing, a neon lamp extending about the periphery of said dial face and said cover having a rim portion for reflecting the light of said neon lamp to said dial face, a terminal post mounted on said gauge and connected to said neon lamp, an electrical conductor connected at one end to said terminal and the other end for connecting a distributor of said motor and ground means connecting said neon lamp whereby upon operation of said motor said pressure gauge will indicate the pressure of the cylinder at the instant the neon light is illuminated.

References Cited

UNITED STATES PATENTS

| 818,822 | 4/1906 | Fernald | 73—431 |
| 1,957,894 | 5/1934 | Longenecker | 73—392 X |
| 2,664,012 | 12/1953 | Newsome | 324—17 X |

RICHARD C. QUEISSER, *Primary Examiner.*

JERRY W. MYRACLE, *Assistant Examiner.*